WIDE FREQUENCY BAND RECORDING

Filed Oct. 12, 1965

INVENTOR
FRANK A. COMERCI
BY Ernest J. Weinberger
John W. Pease
ATTORNEYS

INVENTOR
FRANK A. COMERCI
BY Ernest J. Weinberger
John M. Blome
ATTORNEYS

WIDE FREQUENCY BAND RECORDING

Filed Oct. 12, 1965 3 Sheets-Sheet 3

INVENTOR
FRANK A. COMERCI
BY Ernest F. Weinberger
John M. Pease
ATTORNEYS 3,412,218
Patented Nov. 19, 1968

1

3,412,218

WIDE FREQUENCY BAND RECORDING

Frank A. Comerci, Stamford, Conn., assignor, by mesne assignments, to the United States of America as represented by the Secretary of the Navy Filed Oct. 12, 1965, Ser. No. 495,357
7 Claims. (Cl. 179—100.2)

ABSTRACT OF THE DISCLOSURE

Apparatus for recording a wide frequency signal as a plurality of separate low frequency bands on channels of a recording medium that have been modulated by a pair of quadrature square wave signals, and for simultaneously recording the quadrature signals, on another two channels.

Figure 1:
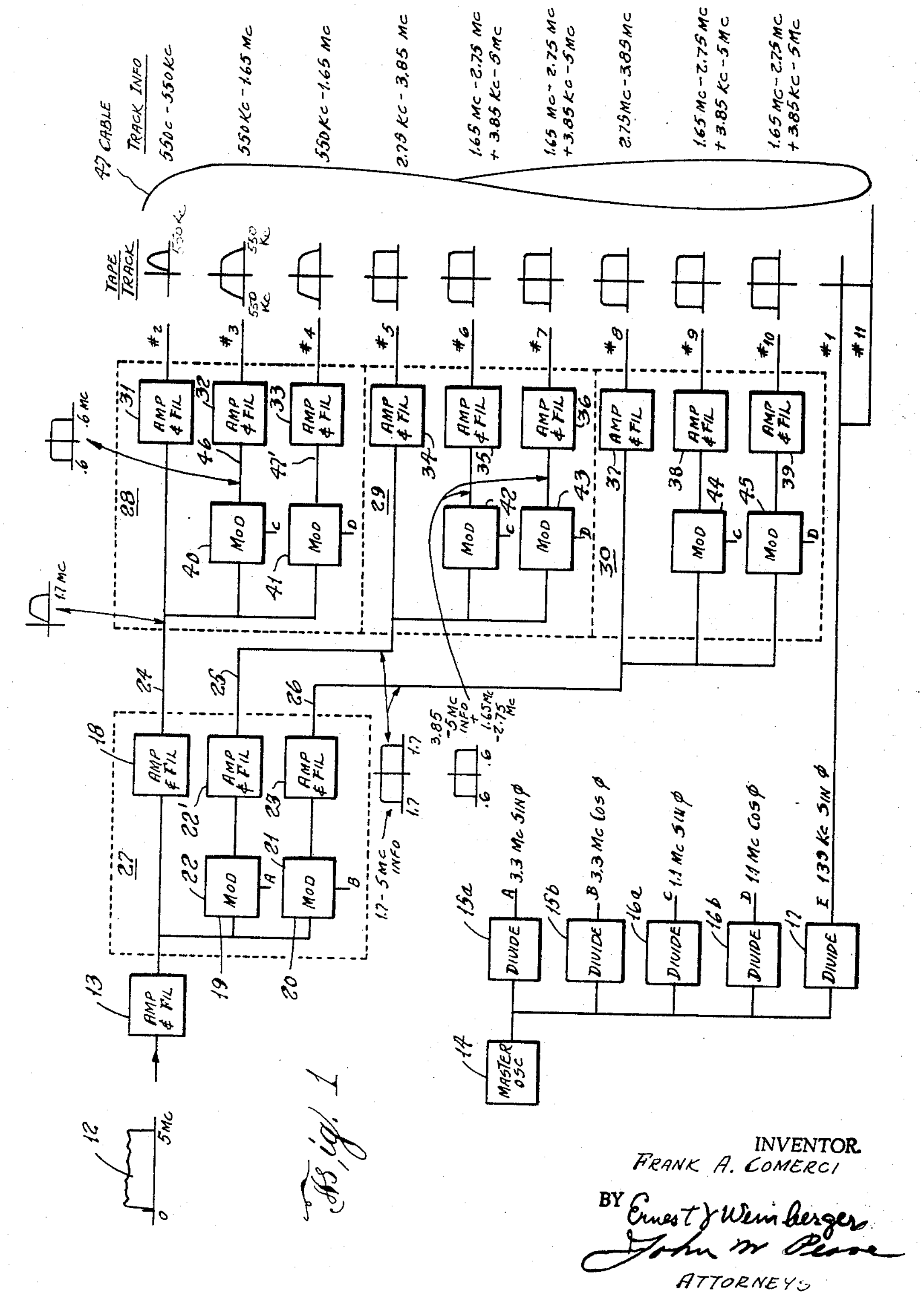

This invention relates to the recording of wide frequency bands by a recording system having a relatively narrow frequency band response or cut-off and more particularly to a technique of recording such wide band information on a multitrack or channel magnetic tape recorder or the like.

The problem is most evident in those cases where it is necessary to record, on available types of equipment, high frequency signals as for example video information. In view of the fact that recorders are inherently limited by their frequency response, one approach perfected in this invention is to subdivide the frequency spectrum to be recorded into a number of bands and then to transpose these subdivided bands into the range of the recorder and to record these transposed bands individually on separate tracks or channels of the recorder. Another approach often expressed is to increase the velocity of the recording medium so as to expand the frequency range of the recording. This technique, however, introduces two major inherent limitations. First, only relative short recordings can be made due to the requirements of the drive system and the size of the reels. Second, the frequency range cannot be extended beyond a specific limit without distortion and other adverse effects due to the recording medium and the other associated components.

Where the number of recording channels is increased to compensate for the tape velocity the width of the tape must be increased. This results in a tape which is too large and requires costly and weighty equipments for its handling. Additionally the stretch of the tape is increased with width and this results in undesirable distortion and skewing of the medium during processing.

Still another problem encountered is that referred to as "aliasing" which relates to the appearance of certain frequencies being transposed to a low spectrum due to their relation to odd harmonics of the multiplying or mixing frequencies.

In view of the foregoing it is an object of this invention to provide an efficient, accurate, relatively inexpensive device for the recording of wide frequency bands on multichannel low frequency recorders and for reproduction of such recordings.

Another object is to provide a method and technique applicable to presently available multichannel recorders

2 for extending their useful frequency range and response.

A further object is to provide a simple, direct and inexpensive method and device for correcting the timing error introduced by skewing of the recording medium of a recorder.

Still another object is to provide a method and apparatus for electronically analyzing, frequency translating and synthesizing high frequency bands in order to permit their recording and reproduction on frequency response limited devices.

Other objects and advantages will appear from the following description of an example of the invention, and the novel feature will be particularly pointed out in the appended claims.

Figure 2:
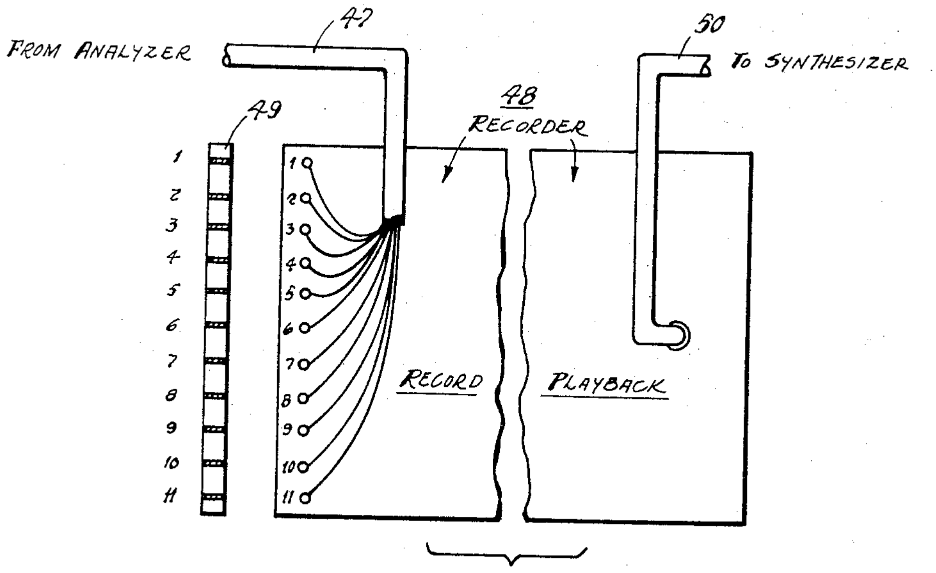
Figure 3:
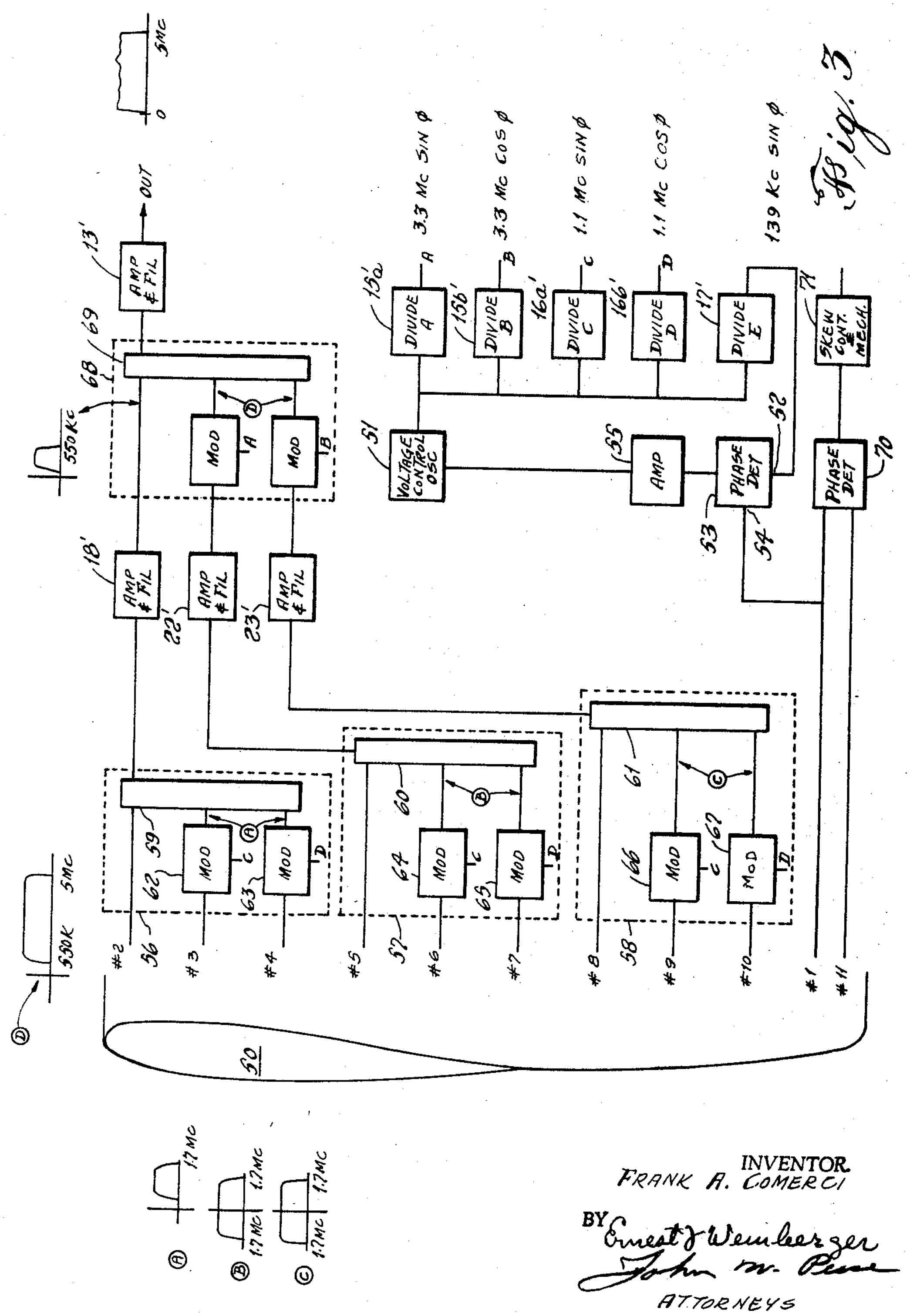

In the accompanying drawings:

FIG. 1 is a block diagram of an embodiment of an analyzer made in accordance with the principles of this invention, FIG. 2 is a representation of the tape and the interconnection of the recorder device with the analyzer and synthesizer; and FIG. 3 is a block diagram of a synthesizer made in accordance with the principles of this invention.

In accordance with the concept of this invention, the recording of wide band inforamtion on a plurality of parallel tracks of tape or recording medium, the input signal is electronically processed or analyzed to divide the original bandwidth into several channels of smaller bandwidth, each of which is subsequently frequency-translated to a low frequency band. These translated bands are then recorded on parallel tracks of the tape. On reproduction, the information recorded on each channel is amplified using amplitude and phase equalization and then translated in frequency to its original high frequency band. Finally, the outputs of all the channels are summed or added to recreate or synthesize the original wide band information.

In the embodiment of the analyzer of FIG. 1, the wide band signal information shown at 12, which only, for the purposes of this description has been illustrated as extending up to 5 mc., is applied to amplifier and band pass filter 13. This filter eliminates all the frequency components above the information spectrum which in this case is 5 mc. If these higher frequency components were permitted to enter the system they, and especially those occuring at or near the odd harmonics of the mixing or multiplying frequencies would be translated into the low bands to be recorded and ultimately erroneously reappear in the recreated 5 mc. information spectrum.

Controlled master oscillator 14 generates a 13.3 mc. signal from which the quadrature or sine and cosine squarewave functions of its division are generated by flip-flop divider circuits 15–17 as indicated. The output of amplifier filter 13 is fed along three paths. The first path applies its output to band pass amplifier filter 18 which cuts off at approximately 1.7 mc. or ⅓ of 5 mc. The other two paths are applied to one input (19, 20) of modulators 21 and 22. The other inputs A and B to modulators 21 and 22 receive the quadratured outputs of dividers **15*a* and 15*b* at a frequency of 3.3 mc. or approximately ⅔ of 5 mc. Thus the input information (5 mc.) is multiplied in one path by a squarewave function of 3.3 mc. (sine phase) and in the other path by the same square wave function shifted in phase by 90° (cosine phase). This multiplication or mixing translates the signal information frequency band by 3.3 mc. For example, 3.3 mc. information will appear at a D.C. frequency, 3.1 mc. will appear as a negative 200 kc. frequency and 3.5 mc. will appear as a positive 200 kc. frequency. Thus the information has been translated about 0 or D.C. frequency extending approximately 1.7 mc. (5–3.3 mc.) above and 1.7 mc. (3.5–5 mc.) below. The quadrature translated outputs are applied to amplifier and low-pass filters 22′ and 23 having cutoff of 1.8 mc. The information carried by these two quadrature outputs constitutes the information covered from approximately 1.7–5 mc. while the direct information through filter 18 covers from approximately 0–1.7 mc. Therefore the total covers 0–5 mc. or the entire information spectrum. The three outputs 24, 25, 26 of the first analyzing unit 27 are applied to three identical secondary processing units 28, 29 and 30.**

Each of these secondary processing or analyzing units divide the input thereto into three paths. The first or direct path feeds amplifier low pass filters 31, 34 and 37 of 31–39 which filters are 600 kc. low pass filters. The designations at the outputs of these filters refer to the tape track on which they are to be subsequently recorded. The other two paths of each input have their respective signals (frequency) multiplied by modulators 40–45 which are in turn provided with 1.1 mc. quadratured square wave signals from dividers **16*a* and 16*b*.**

Considering the secondary processing unit 28 whose input signal extends over the spectrum up to 1.7 mc. or more accurately 1.65 mc. of the input at 12 the filter 31 passes only that portion thereof below approximately 600 kc. to output 2. Modulators 40 and 41 multiply and translate this input band by 1.1 mc. so that the resulting output therefrom contains the original information translated thereabout, with line 46 and 47′ carrying the information in a frequency spectrum approximately from −.55 to +.55 mc. in addition to the higher bands. The information on each line is identical except for the quadrature relation therebetween and covering the original information band approximately from 550 kc. to 1.65 mc. which is restricted to the output spectrum by filters 32 and 33.

Secondary processing units 29 and 30 operate in a like manner on the quadratured outputs of lines 25 and 26. These result in a series of multiple quadratured outputs covering the information band from 1.65 mc. to 5 mc. restricted to an output band within 550 kc. It should be noted that tracks 6, 7, 9 and 10 each contain two bands of information all of which information is identical. The reason for this apparent excess of information will be explained when the synthesizing operation is considered.

The constant frequency signal output of divider network 17 is simultaneously applied to the outer recording tracks which constitute the control signals. These signals are applied to the outer tape tracks so that they will reflect the greatest linear skew disparity existing on the tape.

The outputs of each of the tracks 1–11 of the analyzer are fed via cable 47 to the corresponding record inputs 1–11 of recorder 48, see FIG. 2. This multitrack recorder 48 is any one of a number of presently available recorders such as an Ampex FR 100 recorder/reproducer which at high speed are capable of recording and playing back signals covering the frequency spectrum up to at least 600 kc. The recorder by way of this arrangement records on the tape 49 which is of sufficient width to place thereon, all the necessary tape tracks. The tape is then played back or reproduced and the outputs thereof are fed by way of cable 50 to the synthesizer which is illustrated in FIG. 3.

Voltage controlled oscillator 50 provides a carrier frequency identical to that of the master oscillator 14 of the analyzer but is further provided with a feedback frequency control circuit. Oscillators of this type are readily available and in general are controlled through the use of a voltage sensitive capacitor which forms the control element of the tuning. Other oscillators may employ mechanical voltage control circuitry. The signals reproduced at the recorder output are identical to those previously recorder and therefore by subjecting these signals to processing which is the reverse of that originally applied, the original information is recreated. Clearly this form of synthesis necessitates the use of a master oscillator locked in frequency and phase to that used in the analysis. Since the two oscillators cannot be so related even if they were physically identical in all respects a control circuit to maintain such a relationship is required.

The output of voltage controlled oscillator 51 is divided down through divider networks **15*a*′–17′ which dividers are identical to those similarly referenced in the analyzer of FIG. 1 and they provide the same square wave outputs. The output of the lowest frequency divider 17′ is applied to one input 52 phase detector 53 while its other input 54 receives the reproduced signal on either track 1, as shown, or 11. The phase detector 53 compares these two fixed frequency carrier signals and produces an output voltage whose amplitude is a function of their difference in frequency and phase. If the inputs are identical then an output voltage corresponding zero shift is fed to amplifier 55 for all other conditions a voltage above or below this voltage is applied. After amplification the control voltage is applied to the control element of the oscillator 51** to correct its output until it is locked-in with the master oscillator of the analyzer on the tape.

The first stage of synthesis comprises units 56, 57, 58 which in each constitutes similar components or blocks. The reproduced outputs of tracks 2, 5 and 8 are fed directly to their respective adder networks 59, 60 and 61. The other inputs are applied to their respective modulators 62–67 wherein these are multiplied with the 1.1 mc. quadratured square wave and the sum products delivered at the output which is upwardly transposing the frequency spectrum. These outputs are added so that for each three inputs a single combined output is produced which covers an expanded frequency band. These new combined outputs are first filtered (18′, 22′ and 23′) and then secondarily mixed in stage 68 and the final three outputs of stage 68 added at 69, filtered by filter 13′.

The outputs of channels 1 and 11 are applied as the two inputs to phase detector 70. Where the tape passes through or by the reproduce head in perfect alignment the two signals on these channels will be in phase. If, however, the tape is misaligned due, as for example, to pulling etc., then a phase difference will be detected. This difference will be greatest for the outermost tracks and the voltage output of the detector 70 is fed to a skew control mechanism 71 which is physically affixed to the reproduce head to provide for movement thereof. The mechanism can be of any variety as for example a servo system with a feedback circuit to align the head. The arrangement provides for both compensation of skewing due to recording and reproducing.

Viewed somewhat differently one might consider a timing error and the primary source of this timing error is the recording and reproducing process. Tape skew is the main offender. To minimize this source of error, a skew correcting device is employed. During recording, square wave control signals are recorded on each edge tracks of the tape. On reproduction, the phase, or timing, of these control signals is compared. If correction is required, an error signal is automatically generated and applied to the skew correcting device which alters the azimuth of the reproducing head. Since the timing error due to skew increases linearly over the width of the tape, correction of the edge track timing automatically corrects the timing in all the tracks.

Summarizing the overall operation of the system that in recording wide band information on several parallel tracks of tape, the input signal must be electronically processed or analyzed to divide the original bandwidth into several channels of smaller bandwidth, each of which is frequency translated to a low frequency band. These are recorded on parallel tracks of the tape. On reproduction, the information on each track is amplified used amplitude and phase equalization, then translated in frequency to its original high frequency band. Finally, the outputs of all tracks are added together to recreate, or synthesize, the original signal.

During this processing, it is imperative that the timing of the information on the several channels be maintained accurately or error will result when they are added together on synthesis. To assure this timing, all filters and amplifiers used in the system must have constant time delay over the usable bandwidth and it must be equal for all channels in each stage of the processing.

The processing system employed herein is based on a scheme designated, "Fourier Analysis Using Square Wave Switching." In this scheme, the original bandwidth is divided in a tandem two-step division (each step accomplishing a division by three) into nine information channels each having one ninth of the initial bandwidth. Other combinations and bands are equally applicable.

In the first step, the bandwidth is divided in thirds. The lower third is transmitted directly, using a low pass filter to eliminate information in the upper two thirds of the bandwidth. The same input bandwidth is multiplied (modulated or switched) in separate channels by orthogonal square wave functions having a repetition rate equal to ⅔ the maximum frequency of the original bandwidth. This results in frequency translating information above and below the multiplying frequency to above and below a 0 (DC) frequency.

Following this step, low pass filtering is employed which series two purposes. First, it eliminates all frequencies not originally contained in the upper two thirds of the original bandwidth and, second, it eliminates undesired products of the square wave modulation (which would not exist if sine wave functions and linear modulation were employed). As a result, the outputs of these channels are identical to mathematically multiplying the input signal by sinusoidal functions and then applying low pass filtering. In effect, one channel of the pair is multiplied by sin $\Omega_t$ while the other is multiplied by cos $\Omega_t$. Both sine and cosine channels are required for error-free synthesis.

As a result, three outputs, each having one-third the bandwidth of the original signal are obtained from this first stage of the processing. Each of the three outputs is then subdivided into three smaller bands by an operation identical to that described above, providing a total of nine information channels each carrying one ninth the original bandwidth.

The four modulating functions required for the two steps of processing must be time correlated. They are therefore derived from a master oscillator. The control signals for skew correction are derived from the same oscillator.

Each of the 11 channels—9 information and 2 control—is direct recorded using high frequency bias on 11 tracks of a magnetic tape. On reproduction, the output of each track is amplified, suitably equalized for amplitude and phase in a reproducing amplifier and then delivered to the synthesizing processor.

In the synthesizing process, the nine channels are divided into three groups corresponding to the three outputs of the first stage of analysis. Each group is frequency translated by an operation which is the reverse of that used in analysis. One channel of each group which was not translated in the second stage of analysis is not translated in the synthesis. The remaining two channels of each group are multiplied (modulated) by sine and cosine phase square wave functions corresponding to those used in analysis. Square wave functions are again used with low pass filtering to remove undesired products. The outputs of the three channels associated with each group are then added together to recreate the three signals originally existing after the first stage of analysis. These three signals are then frequency translated through a similar process to recreate the original signal.

The operation of the overall process of translation can be viewed as multiplying the input signal, $\omega t$, by sin $\Omega t$ in channel and cos $\Omega t$ in the other channel of a translating pair.

$$\text{Channel A} = \sin \Omega t \cdot \sin \omega t$$
$$\text{Channel B} = \sin \Omega t \cdot \sin \omega t$$

In synthesizing, each channel is multiplied by corresponding functions.

$$\text{Channel A}' = \sin \Omega_t \cdot (\sin \Omega_t \cdot \sin \omega_t) = \sin^2 \Omega_t \cdot \sin \omega_t$$
$$\text{Channel B}' = \cos \Omega_t \cdot \cos \Omega_t \cdot \sin \omega_t = \cos^2 \Omega_t \cdot \sin \omega_t$$

On adding channels A′ and B′ the output becomes $$\text{Output} = \sin^2 \Omega_t \cdot \sin \omega_t + \cos^2 \Omega_t \cdot \sin \omega_t = (\sin^2 \Omega_t + \cos^2 \Omega_t) \cdot \sin \omega_t$$

Since $(\sin^2 \Omega_t + \cos^2 \Omega_t) = 1$

Output $= \sin \omega_t$ and the original signal is restored.

This analysis can be applied to each group and subgroup to verify the complete two-stage processing.

In order to assure a sine or cosine multiplication in synthesis, there must be relative phase or time correlation between the multiplying functions used in analysis and those used in synthesis. One of the control signals is used as a reference. The function generator used in synthesis is identical to that used in analysis. The master oscillator of the synthesizer is phase-locked with that originally used in the analyzer by comparing the phase of their derived control signals, one recorded on tape, the other locally generated, and using the error signal to control the frequency and phase of the synthesizer master oscillator.

It will be understood that various changes in the details, materials, and arrangements of parts (and steps), which have been herein described and illustrated in order to explain the nature of the invention, may be made by those skilled in the art within the principle and scope of the invention as expressed in the appended claims.

I claim:

1. A device for recording a wide band signal as a plurality of low frequency channels on a recording medium which comprises:

a source of multiple frequency quadrature square wave signals derived from a common generator, said signals being within said wide frequency band, a first band pass filter means covering said wide frequency band connected to receive said wide band signal and pass the same, a first pair of modulators for passing the lower sidebands of said wide band signal having connected thereto the output of said first band pass filter means and the higher frequency of the two quadrature signals, second band pass filter means for passing the same lower sideband as said first pair of modulators having the input connected to the outputs of said first filter and said pair of modulators, modulator means connected to receive the lower frequency quadrature signals and the outputs of said second filter means for passing the lower sidebands of the signal outputs of said second filter means to produce a plurality of outputs in a low frequency band capable of recordation on said medium, third band pass filter means connected to receive the outputs of said second filter means to pass a low frequency band capable of recordation on said medium, means for simultaneous recording on said low frequency channels on said medium, said plurality of outputs, whereby said wide band signal is recorded on said medium in quadrature signals.

2. The device according to claim 1, wherein said modulator means includes a pair of modulators for each output of said second filter means.

3. The device according to claim 2 further including means for simultaneously recording on said medium a pair of monitoring low frequency quadrature signals from said source.

4. The device according to claim 3 further including means for playing back and reforming said wide band signal comprising:

means for reproducing said low frequency channels recorded on said medium, means for generating quadrature signals identical to those of said source, record demodulator means for receiving said quadrature identical signals and demodulating each of said reproduced channels, connected to receive the output of said reproducing means, summation means connected to received the demodulated outputs of said record demodulator means and add them together to reproduce the wide band signal.

5. The device according to claim 4, wherein said means for generating identical quadrature signals includes:

a voltage controlled oscillator, frequency divider means connected to said oscillator for producing quadrature subharmonics thereof, phase detector for comparing the phases of two inputs and having a voltage output dependent on the difference in phase of said two inputs, one input connected to receive one of the reproduced pair of monitoring low frequency quadrature signals and the other input connected to receive the said subharmonic correspond thereto, said voltage output of said detector connected to control the frequency of said oscillator.

6. The device according to claim 5 further including delay line means disposed at said one input of said phase detector to compensate for the delay introduced by the recording process.

7. The device according to claim 6 further including skew compensating means including:

voltage controlled skew control means for adjustment of the playback head of said reproducing means, second phase detector means connected to receive at its inputs said monitoring signals and to produce a voltage output dependent on the phase relationship of said monitoring signals, said output of said second phase detector connected to said voltage controlled skew means.

References Cited

UNITED STATES PATENTS

| | | | |
|---|---|---|---|
| 2,751,439 | 6/1956 | Burton | 179—100.2 |
| 2,813,927 | 11/1957 | Johnson | 179—100.2 |
| 2,937,239 | 5/1960 | Garber et al. | 179—100.2 |
| 2,944,113 | 7/1960 | Wehde et al. | 179—100.2 |
| 3,371,157 | 2/1968 | Bushway | 179—100.2 |

BERNARD KONICK, *Primary Examiner.*

J. R. GOUDEAU, *Assistant Examiner.*